(12) United States Patent
Raventos et al.

(10) Patent No.: US 12,141,235 B2
(45) Date of Patent: Nov. 12, 2024

(54) SYSTEMS AND METHODS FOR DATASET AND MODEL MANAGEMENT FOR MULTI-MODAL AUTO-LABELING AND ACTIVE LEARNING

(71) Applicant: TOYOTA RESEARCH INSTITUTE, INC., Los Altos, CA (US)

(72) Inventors: Allan Raventos, San Francisco, CA (US); Arjun Bhargava, San Francisco, CA (US); Kun-Hsin Chen, Mountain View, CA (US); Sudeep Pillai, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 306 days.

(21) Appl. No.: 17/233,064

(22) Filed: Apr. 16, 2021

(65) Prior Publication Data

US 2022/0335258 A1   Oct. 20, 2022

(51) Int. Cl.
*G06F 18/214* (2023.01)
*G06F 18/25* (2023.01)
*G06N 3/08* (2023.01)
*G06V 20/56* (2022.01)

(52) U.S. Cl.
CPC ...... *G06F 18/2148* (2023.01); *G06F 18/2155* (2023.01); *G06F 18/256* (2023.01); *G06N 3/08* (2013.01); *G06V 20/56* (2022.01)

(58) Field of Classification Search
CPC .............. G06F 18/2148; G06F 18/256; G06F 18/2155; G06N 3/08
See application file for complete search history.

(56) References Cited

U.S. PATENT DOCUMENTS

| | | | |
|---|---|---|---|
| 10,535,191 B2 | 1/2020 | Sachdeva et al. | |
| 11,165,954 B1* | 11/2021 | Beach | H04N 23/65 |
| 11,443,232 B1* | 9/2022 | Rahman | G06F 18/2148 |
| 2011/0314367 A1* | 12/2011 | Chang | G06F 16/437 |
| | | | 715/230 |
| 2017/0200061 A1* | 7/2017 | Julian | G08G 1/04 |
| 2018/0349784 A1 | 12/2018 | Zheng et al. | |
| 2019/0140994 A1* | 5/2019 | Snider | H04L 51/234 |
| 2019/0205667 A1 | 7/2019 | Avidan et al. | |
| 2019/0317507 A1 | 10/2019 | Zhang et al. | |
| 2019/0325267 A1* | 10/2019 | Chen | G06F 18/2415 |
| 2019/0371426 A1* | 12/2019 | Embree | G16B 5/00 |

(Continued)

OTHER PUBLICATIONS

Pan, et al., "Label and Sample: Efficient Training of Vehicle Object Detector from Sparsely Labeled Data", arXiv: 1808.08603v1, Aug. 26, 2018, pp. 1-12.

*Primary Examiner* — Qun Shen

(74) *Attorney, Agent, or Firm* — Seyfarth Shaw LLP

(57) ABSTRACT

Datasets for autonomous driving systems and multi-modal scenes may be automatically labeled using previously trained models as priors to mitigate the limitations of conventional manual data labeling. Properly versioned models, including model weights and knowledge of the dataset on which the model was previously trained, may be used to run an inference operation on unlabeled data, thus automatically labeling the dataset. The newly labeled dataset may then be used to train new models, including sparse data sets, in a semi-supervised or weakly-supervised fashion.

20 Claims, 5 Drawing Sheets

(56) References Cited

U.S. PATENT DOCUMENTS

| | | | |
|---|---|---|---|
| 2020/0133964 A1* | 4/2020 | Lee | G06F 16/355 |
| 2020/0160178 A1* | 5/2020 | Kar | G06T 11/00 |
| 2021/0117717 A1* | 4/2021 | Ha | G06N 20/00 |
| 2022/0171995 A1* | 6/2022 | Balasubramanian | G06N 20/00 |

* cited by examiner

SYSTEMS AND METHODS FOR DATASET AND MODEL MANAGEMENT FOR MULTI-MODAL AUTO-LABELING AND ACTIVE LEARNING

FIELD OF TECHNOLOGY

The present disclosure relates to improving machine learning, and more particularly, to automatically labeling datasets for autonomous driving models and networks.

BACKGROUND

Machine learning provides a basis for the design, programming and operation of autonomous vehicles. Autonomous and semi-autonomous vehicles may be trained according to environmental and situational data allowing the vehicle to operate and navigate known and unknown trajectories. Sensors installed and configured on an ego vehicle, i.e., an autonomous or semi-autonomous vehicle, provide environmental data to a machine learning system. Monocular cameras can be a cost-effective approach when compared to more complex imaging systems including LiDAR, stereo cameras or the like, however the sensor data from monocular cameras does not explicitly include depth information. Instead, the vehicle implements processing routines that derive depth information from the monocular images.

One of the challenges in machine learning is labeling datasets. In order for systems relying on active learning to process the vast amount of data collected, features of the data must be labeled. Labeling features of the collected data allows the system to identify the same or similar features in subsequently obtained data. Traditionally, in computer vision and autonomous driving modeling, datasets are manually labeled by employees, contractors or crowd-sourced resources that view the data, such as video frames, and apply a label to target features. Labeling datasets for is a slow and costly process that does not scale with the rate at which the raw data is collected by the numerous sensors and on-board systems.

SUMMARY

Aspects of the present disclosure provide for systems and methods for managing multi-modal datasets in active learning pipelines. Models that have been trained on datasets and have already been labeled may provide a good prior on the true labels for a multi-modal scene. Further aspects of the disclosure provide for combining inference results of several high-performing models, or ensembles, for a particular task improves the quality of these pseudo-labels further. Aspects of the present disclosure may leverage properly versioned models (including model weights and which dataset they were trained on) to run inference on unlabeled data and thus generate auto-labeled datasets. These auto-labeled datasets may then be used to train new models. The system may record that the new model was obtained using auto-labels and also which models and unlabeled data led to the auto-labels. The system may also support the ability to leverage sparsely labeled datasets, where auto-labels may be used to fill in gaps, and thus train in semi and weakly supervised fashion.

According to one aspect a method for managing a dataset is disclosed. A first dataset may be received. The first dataset may comprise unlabeled data. The first dataset may be input into a trained network. The trained network may be trained on an existing model. The unlabeled data of the first dataset may be labeled using inference from the trained network to generate a labeled dataset. An untrained network may be trained using the labeled dataset to generate a new model.

According to another aspect, a system for managing a dataset is disclosed. The system may include one or more processors, a memory communicably coupled to the one or more processors. The memory may store an inference module including instructions that when executed by the one or more processors cause the one or more processors to generate a labeled dataset. The dataset may be generated by receiving a first dataset comprising unlabeled data and inputting the first dataset into a trained network. The trained network may be trained on an existing model. The unlabeled data of the first dataset may be labeled using inference from the trained network to generate a labeled dataset. An untrained network may be trained using the labeled dataset.

According to another aspect, a non-transitory computer-readable medium for managing a dataset is disclosed. The medium may include instructions that when executed by one or more processors cause the one or more processors to receive a first dataset, the first dataset comprising unlabeled data and input the first dataset into a trained network. The trained network may be trained on an existing model. The unlabeled data of the first dataset may be labeled using inference from the trained network to generate a labeled dataset. An untrained network may be trained using the labeled dataset.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
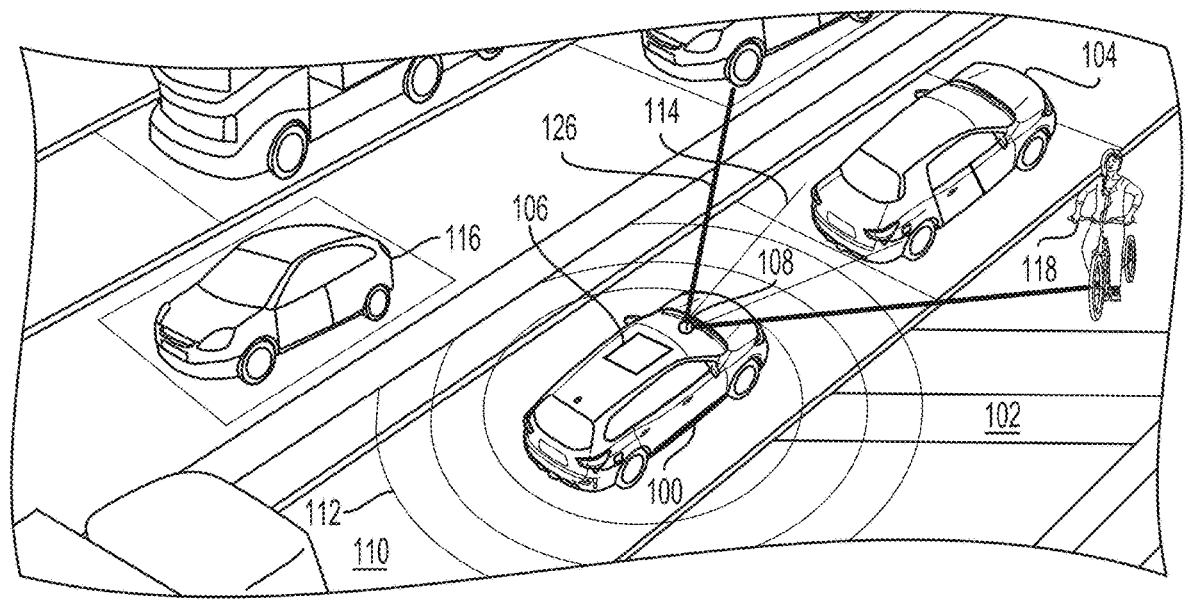
FIG. 1A illustrates an example of an autonomous agent according to aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Actions of autonomous agents and semi-autonomous agents may be controlled or adjusted based on objects detected within a vicinity of the agent. For example, a route may be planned for an autonomous agent based on the locations of other objects on the road. As another example, a route may be adjusted to avoid a collision if a detected object is in the path of the agent. In the present disclosure, an agent refers to an autonomous agent or a semi-autonomous agent.

The agent may detect objects from outputs of various sensors. For example, a 2D camera may generate 2D red-green-blue (RGB) images and a light detection and ranging (LIDAR) sensor may generate a 3D point cloud that provides height and depth information. The sensor outputs may be combined into a multi-modal frame, where a sequence of frames generates a video. Object detection models, such as a convolutional neural network (CNN), are trained to identify objects of interest in each frame. Each identified object may be labeled or annotated with a bounding box. For each frame of a sequence of frames, the model may output a classification label corresponding to each identified object and a bounding box corresponding to a location of each object. The object detection model may be referred to as the model. An annotated frame may refer to a frame that includes the generated bounding box. The annotated frame may also include the classification label or a reference to the classification label.

To improve the model, it is desirable to label objects of interest that may unknown to the particular model such that upon running the model again, such objects and objects perceived to have similar attributes, are more readily identifiable. Automatically labeling the objects of interest reduces the cost and time required in generating reliable datasets on which subsequent systems and networks may be trained.

Video generated by a machine learning model may be a high resolution (e.g., high quality) video. Therefore, the size of the video file may be large. For example, the size of a video file may be more than twice a size of the output of an object detection model. As is known to those of skill in the art, conventional wireless networks have limited bandwidth. Furthermore, a coverage area of conventional wireless networks is not uniform, resulting in inconsistent quality of service. Therefore, data may be uploaded to a remote device, such as a server, when the autonomous agent is parked at a location, such as a garage at a home, with a high bandwidth data connection. That is, the data may be transmitted when the agent has established a high bandwidth connection with the remote device. The data may include the video and the output of the object detection model. Additionally, in some cases, the agent also uploads the sensor data.

The data transmitted via the high bandwidth connection may be used to analyze a model and update the model. Unknown objects or mis-classified objects may be appropriately labeled offline to update datasets and re-train the models. In conventional systems, labeling un-annotated data required manual labeling by human analysts. As more data is collected and labeled over time, the model may be re-trained. If the re-trained model is an improvement on the previous model, the re-trained model is deployed. The time between training an initial model and re-training the model may be in the order of days or months.

According to aspects of the present disclosure, to mitigate the limitations of conventional manual data labeling, datasets for autonomous driving systems and multi-modal scenes may be automatically labeled using previously trained models as priors. Properly versioned models, including model weights and knowledge of the dataset on which the model was previously trained, may be used to run an inference operation on unlabeled data, thus automatically labeling the dataset. The newly labeled dataset may then be used to train new models, including sparse data sets, in a semi-supervised or weakly-supervised fashion.

FIG. 1A illustrates an example of an agent 100 using sensors 106, 108 to detect objects 104, 116, 118, according to aspects of the present disclosure. As shown in FIG. 1A, the agent 100 may be traveling on a road 110. A first vehicle 104 may be ahead of the agent 100 and a second vehicle 116 may be adjacent to the agent 100. Additionally, a cyclist 118 may be in a bike lane 102 adjacent to the agent 100. In this example, an object detection system of the agent 100 is in communication with a 2D camera 108, such as a 2D RGB camera, and a LIDAR sensor 106. The 2D camera 108 and the LIDAR sensor 106 may be integrated with the agent 100. Other sensors, such as radio detection and ranging (RADAR) and/or ultrasound, are also contemplated. Additionally, or alternatively, the agent 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream may include a 3D cloud point of objects in a second field of view, such as a forward facing field of view 126. The object detection system may use the data streams of the LIDAR sensor 106 to detect objects in an environment.

The 2D image captured by the 2D camera may include a 2D image of the first vehicle 104 and the cyclist 118, as the first vehicle 104 and the cyclist 118 are in the 2D camera's 108 field of view 114. The object detection system of the agent 100 may extract features from objects of interest in the 2D image. For example, an artificial neural network, such as a convolutional neural network, of the object detection system may extract features of the first vehicle 104 and the cyclist 118. Based on the extracted features, the object detection system may classify the first vehicle 104 as a car and the cyclist 118 as a bicycle rider. Furthermore, the object detection system may localize the first vehicle 104 and the cyclist 118 within a first frame 150, shown in FIG. 1B.

Figure 1B:
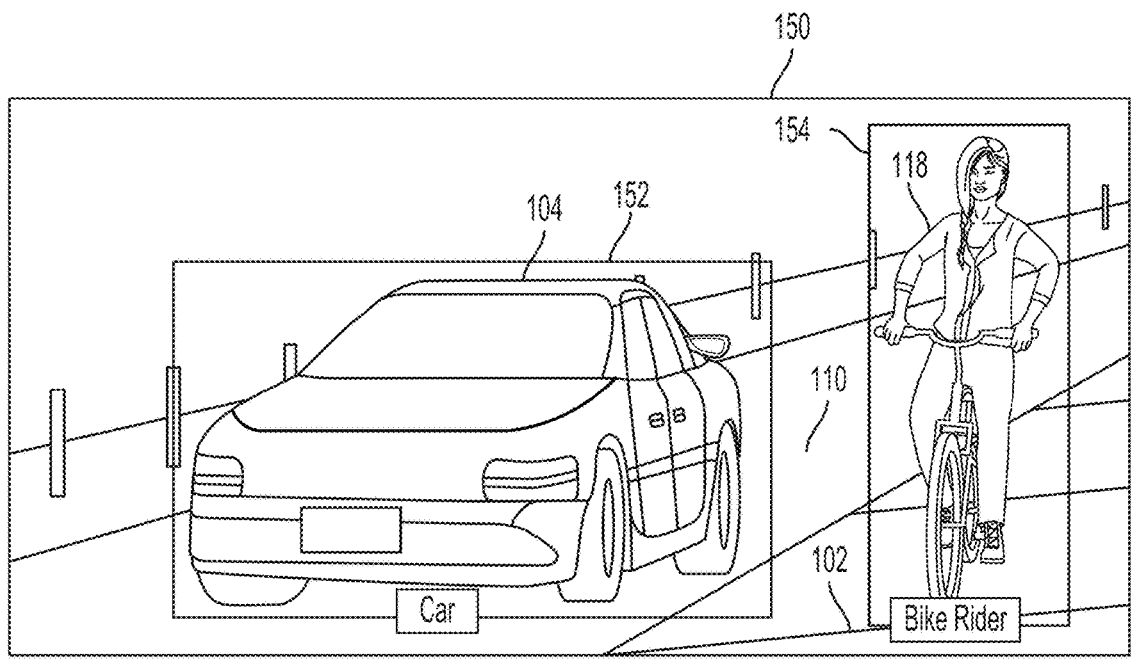
FIG. 1B illustrates examples of labeled frames according to aspects of the present disclosure.

FIG. 1B illustrates an example of the frame 150 generated by an object detection system, according to aspects of the present disclosure. In the present example, the frame 150 includes objects in the 2D camera's 108 field of view 114. Specifically, the frame includes the first vehicle 104 and the cyclist 118, as both the first vehicle 104 and the cyclist 118 are in the 2D camera's 108 field of view 114.

Based on the features extracted by an object detection model, the first vehicle 104 and the cyclist 118 may be labeled (e.g., "car" and "bike rider"). As described herein, the labels may be relics from a previously trained model, or may be the result of an inference module's offline analysis to automatically label the objects as such.

The object detection system may also localize the first vehicle 104 and the cyclist 118 by annotating the locations of each object with a bounding box 152, 154 generated by the object detection model. As shown in FIG. 1B, a first bounding box 152 may be drawn around an area corresponding to the first vehicle 104 and a second bounding box 154 may be drawn around an area corresponding to the cyclist 118. One skilled in the art will appreciate that the labels of FIG. 1B are for illustrative purposes, aspects of the present disclosure are not limited to labeling objects according to the labels shown in FIG. 1B.

The first frame 150 of FIG. 1B may represent one frame of a sequence of frames (e.g., video). An autonomous driving system may control actions of the agent 100 based on the objects detected in each frame. The video generated from the sequence of frames may be stored at the agent 100 for analysis at a later time. Furthermore, the sensor data and/or the model output may also be stored at the agent 100 for analysis at a later time. For example, video, sensor data, and model output may be stored in a memory device of the agent. The stored video, sensor data, and/or model output may be transmitted to a remote device for further analysis as described herein, including using the datasets and multi-modal scene information to generate additional inferences on labels and boundaries of previously unlabeled objects.

For example, a training system or pipeline may receive the frame 150 of FIG. 1B to determine whether the model included unlabeled objects. An offline analysis may leverage other datasets with objects similar to unlabeled objects in the current dataset to infer a label for the unlabeled object. The analysis may determine that the labels ("car" and "bike rider") correspond to the first vehicle 104 and the cyclist 118 and provide such labels to the objects in the scene automatically.

Figure 2:
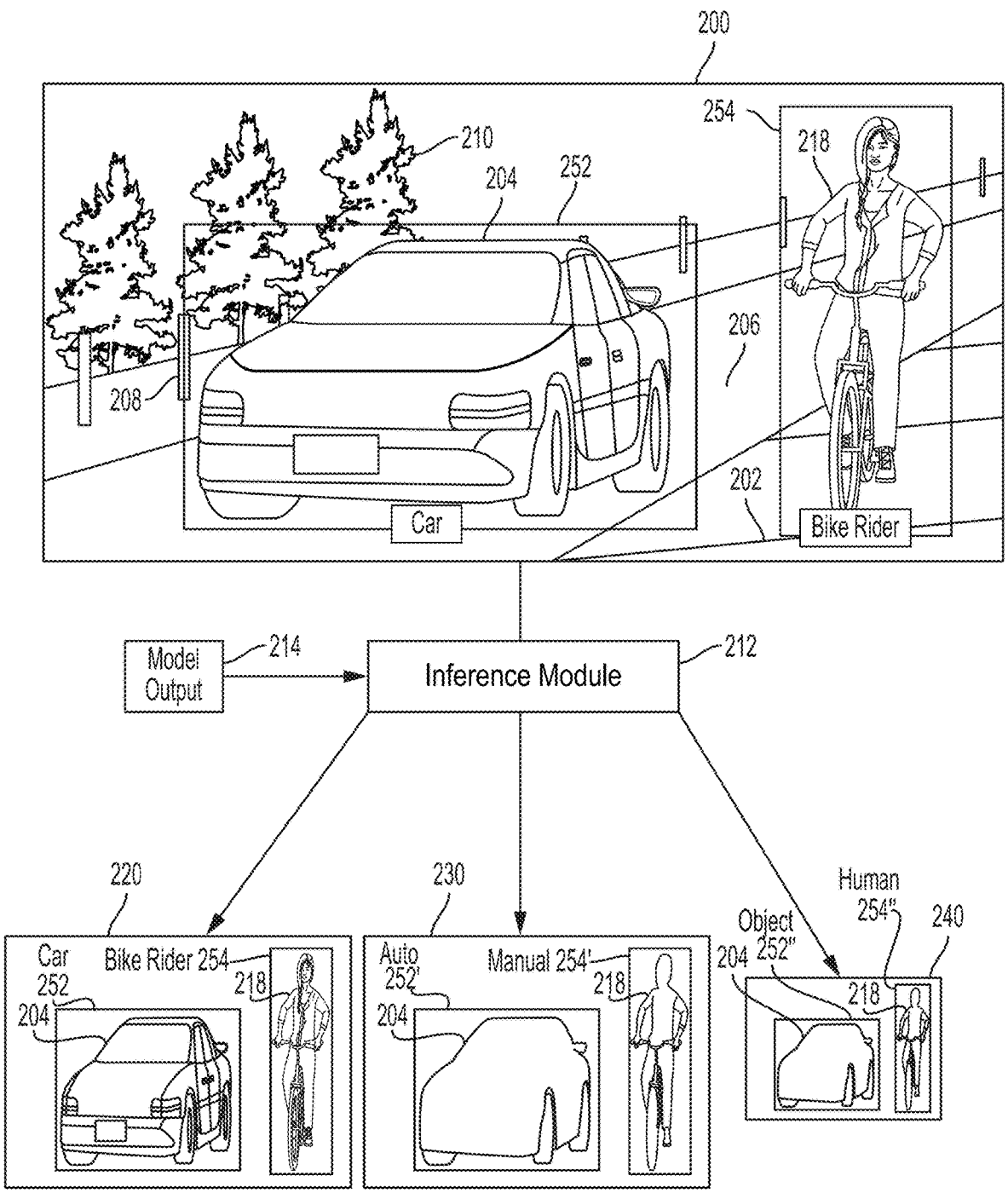
FIG. 2 illustrates an example of labeling a frame by inference according to aspects of the present disclosure.

FIG. 2 illustrates an example of auto-labeling a frame 200, according to aspects of the present disclosure. As shown in FIG. 2, the initial frame 200 may be processed by an inference module 212 of an agent. The frame 200, obtained from an autonomous driving system, or other source, may include previously unknown objects of interest, such as a vehicle 204 on a road 206 and a cyclist 218 on a bike lane 202 that is adjacent to the road 206. The frame 200 also may include a guardrail 208 and trees 210. An object detection model may have previously identified the first vehicle 204 and the cyclist 218, or similar objects, as objects of interest in prior training. The inference model 212 may receive data related to those objects from the model output 214. The data from the model output 214 may be leveraged to assist the inference module 212 in identifying the objects in the frame 200. Therefore, the inference module 212 may output classification labels ("car" and "bike rider") and bounding boxes 252, 254 corresponding to the vehicle 204 and the cyclist 218, respectively.

According to another aspect, the vehicle 204 and cyclist 218 may have been previously labeled by a model during a previous training operation. Other objects, however, such as the guardrail 208 or trees 210 may not have been previously labeled. The inference module 212 may take as input data information from the model output 214 to assist the inference module's identification and automatic labeling of the guardrail 210 and trees 210, without human interaction.

According to one aspect, a hash function using the object and a unique identifier of the inference model may be used to determine a Universally Unique Identifiers (UUID). The inference module 212 may be considered task-specific. As such, the inference module 212 may have one or more associated ontologies and it may be known beforehand what labels/annotation-type the inference module 212 is going to produce.

According to one aspect, the inference module may process the frame 200 according to one or more ontologies, making the auto-labeling features applicable to a broad range of applications. For example, the inference module may output a labeled data set according to a first ontology 220 in which the vehicle 204 is labeled as "car" 252 and the cyclist 218 is labeled as a "bike rider" 254. According to a different applied model, the inference module 212 may analyze the same frame 200 to identify and label the vehicle 204 as "Auto" 252' and the cyclist 218 as "Manual" 254' according to a second ontology 230. Using a third ontology, 240, the inference module 212 may identify the vehicle 204 as "object" 252" and the cyclist 218 as "Human" 254". One skilled in the art will recognize that other ontologies and potential labels may be contemplated within the scope and spirit of the present disclosure.

The inference module 212 of the present disclosure may use a deep learning architecture. The deep learning architecture may be embodied in a deep convolutional neural network (CNN). During training, the CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output of the CNN is more closely aligned with the target (e.g., ground truth).

To adjust the weights, a learning function may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

Figure 3:
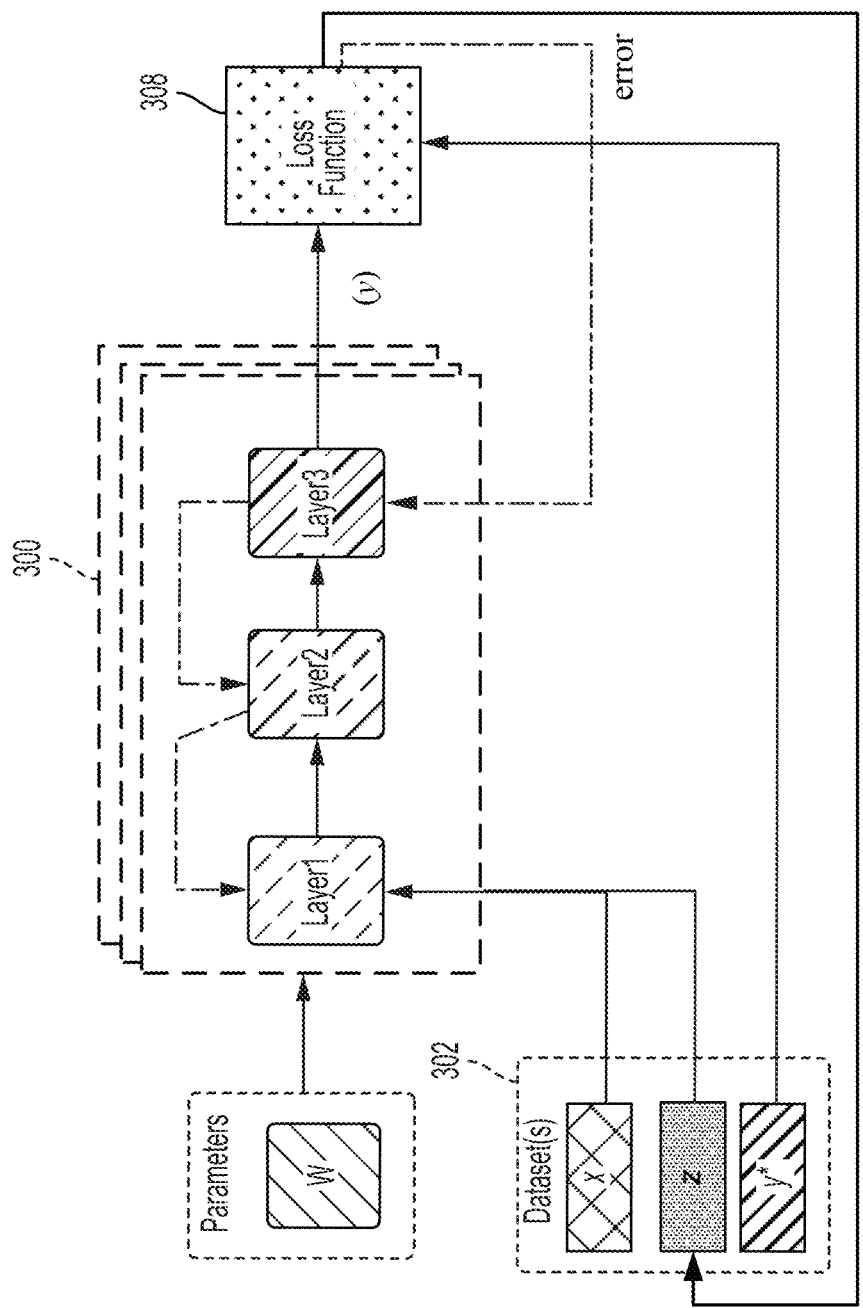
FIG. 3 illustrates a flow diagram for training a model according to aspects of the present disclosure.

FIG. 3 illustrates a flow diagram for training one or more machine learning models 300, according to an aspect of the present disclosure. In one configuration, images (x) may be stored in a data source 302, such as a training server. The data source may also store ground truth samples (y*) corresponding to one or more objects in the images (x).

The machine learning model 300 may be initialized with a set of parameters (w). The parameters (w) may be used by layers of the machine learning model 300, such as layer 1, layer 2, and layer 3, of the machine learning model 300 to set weights and biases. Layer 3 may be a fully connected layer. During training, the machine learning model 300 receives images (x) to label detected objects.

The machine learning model 300 may output an inferred label (y) for one or more objects in each image (x). The inferred labels (y) may be received at a loss function 308. The loss function 308 may compare the predicted labels (y) to the ground truth actions (y*). The prediction error is the difference (e.g., loss) between the predicted label (y) and the ground truth action (y*). The prediction error is output from the loss function 308 to the machine learning model 300. The error may be back-propagated through the machine learning model 500 to update the parameters. The training may be performed during an offline phase of the machine learning model 300.

According to another aspect, additional images (z) may be input into the one or more machine learning models 300 with known data images (x) to allow the machine learning model 300 if automatically label objects from the images (z) using data from previous images (x) as priors to the model 300. Those newly labeled images and data may then be used in future and subsequent training operations on new datasets. The system may apply labels to new images (z) based on inferences made from known images (x). In this manner the machine learning models 300 may train themselves in a self-supervised, or weakly supervised fashion. Such an implementation may also eliminate the need for human annotators to manually label these offline datasets.

Figure 4:
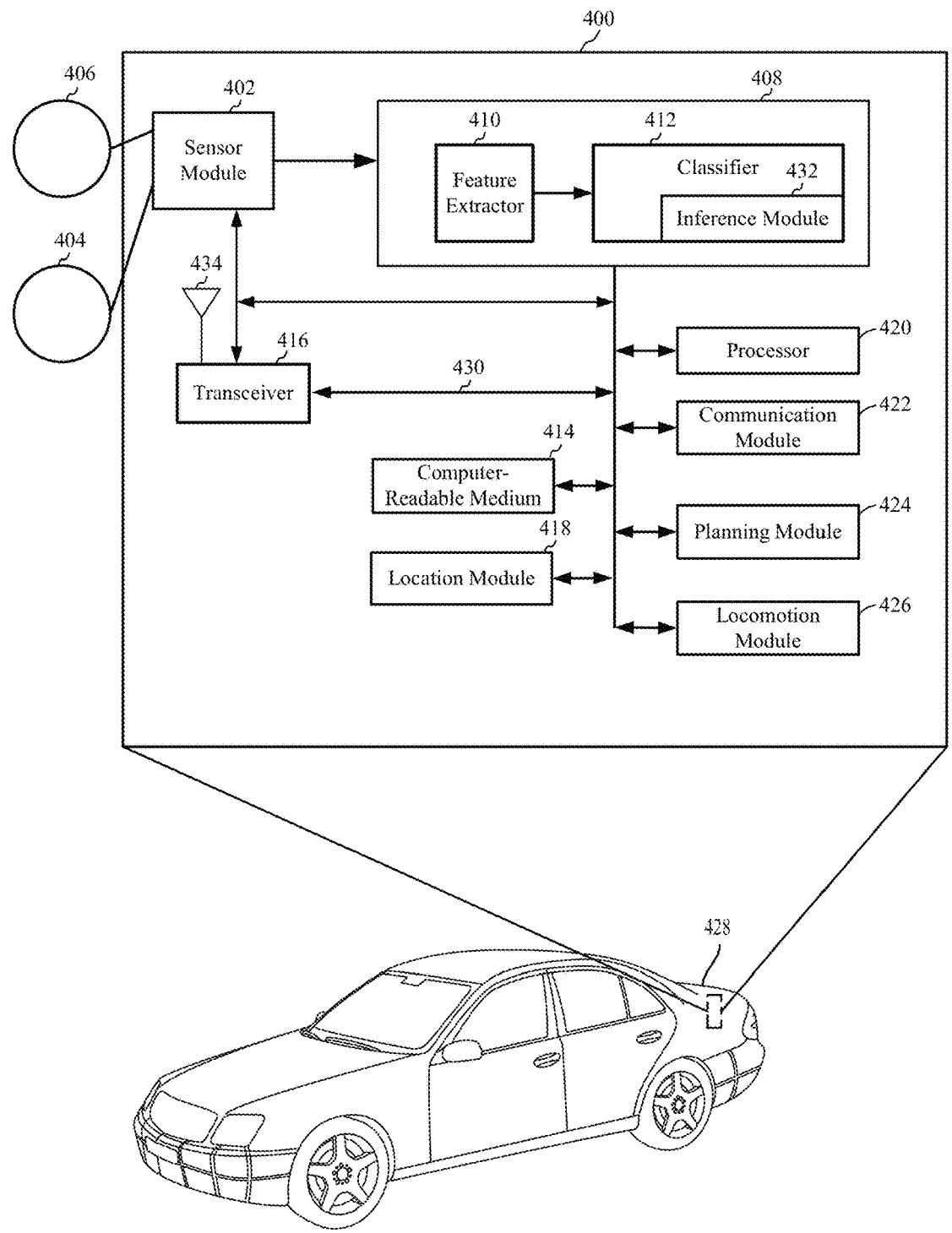
FIG. 4 illustrates a flow diagram for automatically labeling a data set according to aspects of the present disclosure.

FIG. 4 is a diagram illustrating an example of a hardware implementation for an autonomous driving system 400, according to aspects of the present disclosure. The autonomous driving system 400 may be a component of a vehicle, a robotic device, or other device. For example, as shown in FIG. 4, the autonomous driving system 400 is a component of a car 428. Of course, aspects of the present disclosure are not limited to the autonomous driving system 400 being a component of the car 428, as other devices, such as a bus, boat, drone, or robot, are also contemplated for using the autonomous driving system 400.

According to one aspect, the autonomous driving system 400 may be distributed across multiple components, local and remote. For example, the components described herein may be a component of the car 428, or more particularly, certain components may be remote from the car 428. As described herein, certain functions, data analysis, machine learning, model creation and modification, and the like may be completed on remote servers. The results of such analysis and processing may then be loaded on to the car 428 using its various communications components. For simplicity of illustration, certain modules and components are shown as part of the car 428, however, one skilled in the art will recognize that the modules and components may be remote or external to the car 428.

The autonomous driving system 400 may be implemented with a bus architecture, represented generally by a bus 430. The bus 430 may include any number of interconnecting buses and bridges depending on the specific application of the autonomous driving system 400 and the overall design constraints. The bus 430 links together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The autonomous driving system 400 includes a transceiver 416 coupled to the processor 420, the sensor module 402, an artificial neural network module 408, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the artificial neural network module 408 to a server (not shown). According to one aspect, the artificial neural network 408, as described herein, may be an offline system in communication with the inputs and other vehicle systems over a wireless network. In such a configuration, the artificial neural network 408 may develop and train autonomous driving models offline for subsequent deployment or re-deployment.

The autonomous driving system 400 includes the processor 420 coupled to the computer-readable medium 414. The processor 420 performs processing, including the execution of software stored on the computer-readable medium 414 providing functionality according to the disclosure. The software, when executed by the processor 420, causes the autonomous driving system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the artificial neural network module 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as WiFi, long term evolution (LTE), 3G, etc. The communication module 422 may also be used to communicate with other components of the car 428 that are not modules of the autonomous driving system 400.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The autonomous driving system 400 also includes the planning module 424 for planning a route or controlling the locomotion of the car 428, via the locomotion module 426, based on the analysis performed by the artificial neural network 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The artificial neural network 408 may be in communication with the sensor module 402, the transceiver 416, the processor 420, the communication module 422, the location module 418, the locomotion module 426, the planning module 424, and the computer-readable medium 414. In one configuration, the artificial neural network 408 receives sensor data from the sensor module 402. The sensor module 402 may receive the sensor data from the first sensor 406 and the second sensor 404. According to aspects of the disclosure, the sensor module 402 may filter the data to remove noise, encode the data, decode the data, merge the data, extract frames, or perform other functions. In an alternate configuration, the artificial neural network 408 may receive sensor data directly from the first sensor 406 and the second sensor 404.

a system to properly manage a multi-modal multi-label dataset may be particularly challenging to design. As such, aspects of the present disclosure are designed and configured such that the dataset management system holds and versions the datasets. According to one or more aspects, auto-labeling multi-modal datasets enable several possibilities. For example, the LiDAR and cameras may be synced to perform 2D detections on image and lift those detections to 3D renderings or detections. Aspects of the present system also enable additional system-wide functionality such as, for example, estimating depth from monocular cameras or, in training time, from LiDAR inputs.

As shown in FIG. 4, the artificial neural network 408 may include a feature extractor 410, a classifier 412, and an inference module 432. The feature extractor 410, the classifier 412, and the inference module 432 may be components of a same or different artificial neural network, such as a deep convolutional neural network (CNN). The artificial neural network 408 is not limited to a CNN and may be another type of artificial neural network, such as a support vector machine (SVM). The feature extractor 410 receives a data stream from the first sensor 406 and the second sensor 404. The data stream may include a 2D RGB image from the first sensor 406 and LIDAR data points from the second sensor 404. Different spatial environments may be captured in each data stream. Additionally, the LIDAR data points may be separated to multiple streams. For example, one LIDAR data stream may provide a bird's eye view spatial representation and another LIDAR data stream may provide a forward facing view spatial representation. The data stream may include multiple frames, such as image frames.

The feature extractor 410 extracts (e.g., identifies) areas of interest from each frame of the data stream. For example, the feature extractor 410 may be trained to extract features of objects of interest. As another example, the feature extractor 410 may be trained to extract features of different terrains, such as roads, sidewalks, buildings, and background. That is, the feature exactor 410 identifies areas of attention based on the training. The artificial neural network 408 may include one or more feature extractors 440. For example, one feature extractor 410 may be configured to detect objects and another feature extractor 410 may be configured to segment different elements of the data, such as roads, sidewalks, buildings, and background. In another example, each data stream output from a sensor 402, 404 may be received at distinct feature extractors 410.

The feature extractor 410 may encode each set of features in a multi-dimensional tensor. The classifier 412 classifies each set of features received from the feature extractor 410. The inference module 432 may classify (e.g., label) one or more objects of interest and localize each object of interest with a bounding box, as described herein. The feature extractor 410, classifier 412, and inference module 432 may be referred to as an object detection model.

The classifier 412/inference module 432 may output the label and the bounding box to one or more of the sensor module 402, the transceiver 416, the processor 420, the communication module 422, the location module 418, the locomotion module 426, the planning module 424, and the computer-readable medium 414. For example, the classified features may be output to the processor 420 to determine a set of actions that may be performed based on the detected objects and their respective locations in relationship to the car 428. The actions may be retrieved from the computer-readable medium 414 or the planning module 424. Additionally, based on the classified features, one or more of the modules 402, 408, 414, 416, 418, 420, 422, 424, 426 may determine or update an action for the car 428. The planning module 424 may perform route planning, collision avoidance, or other planning functionality based on the classified features.

Additionally, and more particularly to aspects of the present disclosure, the artificial neural network 408 may be a remote system or component used offline to train or update one or more model and automatically label datasets with unknown objects. The offline processing may occur as described herein to update the object detection models that may be downloaded to the car 428 for online execution. As described herein, the artificial neural network 408 may also rely on previously and properly trained models to identify and automatically label objects in new datasets. The system may track that a new model was obtained using auto-labels and also may track which models and unlabeled data led to the auto-labels.

Figure 5:
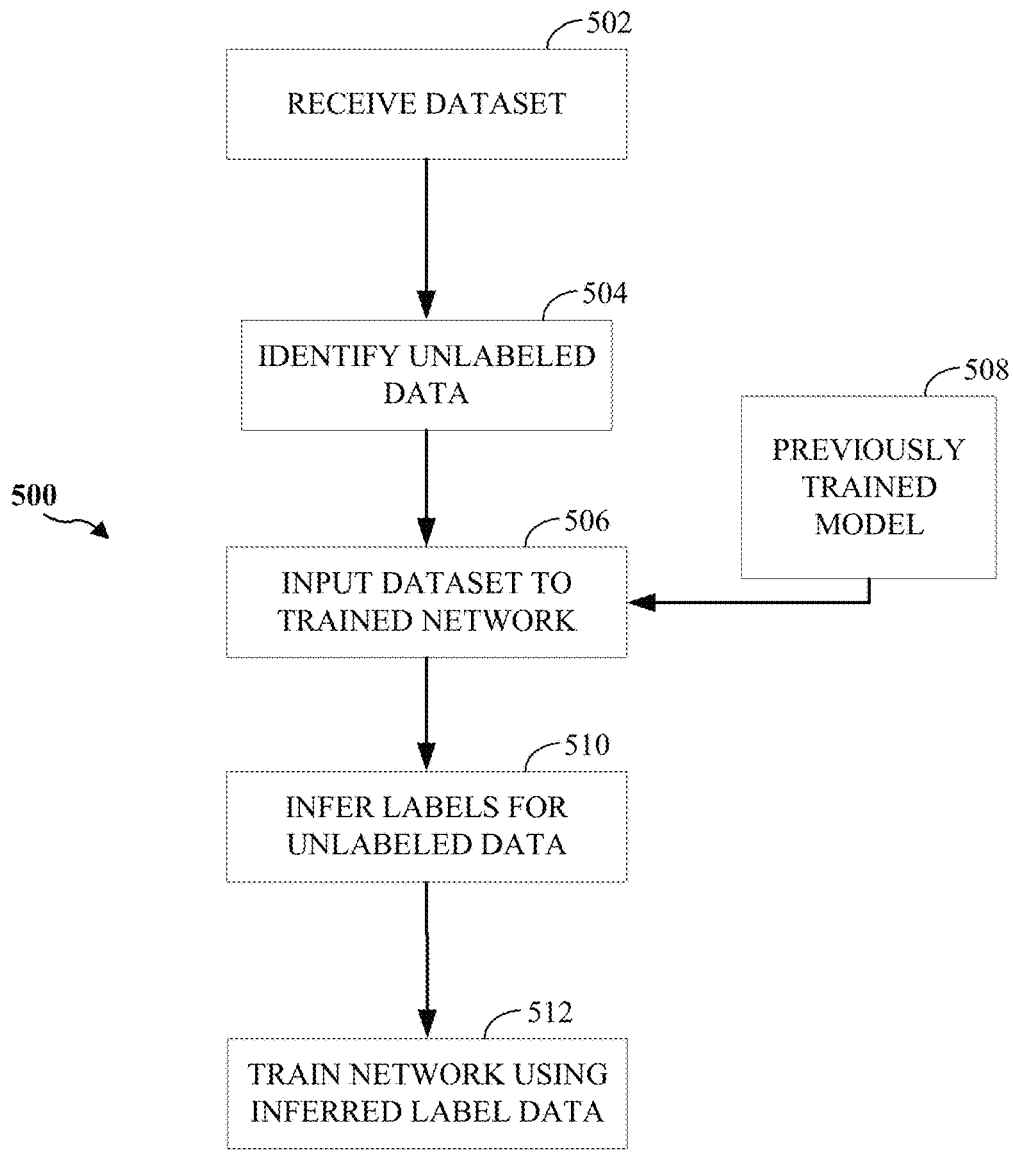
FIG. 5 illustrates a method of labeling a dataset according to aspects of the present disclosure.

FIG. 5 depicts a method 500 of labeling a dataset according to one or more aspects of the present disclosure. The system, as described herein, may include an inference module as a component of an artificial neural network, or the like, configured to automatically infer and apply labels to previously unlabeled data by leveraging properly versioned models, including model weights and identification of the dataset on which they were trained. According to one aspect, as shown in block 502, the system may receive a dataset. As described herein the system, or certain components of the system, may be offline components. The dataset may be obtained from an online system collected from live sensors on a vehicle or may be obtained from another source. The dataset, according to one aspect, may include multi-modal data obtained from on-board sensors, such as, without limitation, LiDAR, RADAR, RGB cameras, or the like.

As shown in block 504, the system may identify unlabeled data in the dataset. According to one aspect, the dataset may include both labeled and unlabeled data. The labeled data, according to one aspect, may provide contextual information used to infer labels for the unlabeled data. As shown in block 506, the dataset may be input into a trained neural network. The trained neural network may have been previously trained on a model 508 including a second dataset, including labeled data. According to one aspect, the previously trained model may be a robust, properly versioned and weighted model.

As shown in block 510, the system may infer auto-labels for the unlabeled data using the previously trained model as a prior. By leveraging the previously, and properly trained model, inference may be run on the present dataset and the unlabeled data to automatically generate apply labels to such data. As described herein, the data from multiple sensors may be synchronized to infer labels for a multi-modal scene. As shown in block 512, the newly labeled datasets may be used to train additional networks. The system may track that the new model was obtained using auto-labels and also track which models and unlabeled data led to the auto-labels. The system also may be configured to leverage sparsely labeled datasets, where auto-labels can be used to fill in the gaps, and thus train in semi and weakly supervised fashion.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RANI from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for managing a dataset comprising:
receiving, at a device that is remotely located from an agent, sensor data collected by one or more sensors associated with the agent and a first dataset including an unlabeled object and one or more labeled objects in a set of frames captured via the one or more sensors over a period of time, the dataset and the sensor being received based on a connection bandwidth at the agent being greater than a bandwidth threshold, the one or more labeled objects being labeled by a first trained network at the agent;
inferring, at a second trained network at the device, a new label for the unlabeled object based on the one or more labeled object in the first dataset and a second dataset including one or more objects similar to the unlabeled object, the new label being different than a respective label associated each of the one or more labeled objects;
labeling the unlabeled object with the new label to generate a third dataset; and
training an untrained network using the third dataset to generate a new model.

2. The method of claim 1 wherein the first dataset comprises data from a group of sensors.

3. The method of claim 2 wherein the group of sensors include two or more of a LiDAR sensor, a RADAR sensor, an RGB camera, monocular camera, and/or stereo camera.

4. The method of claim 1 wherein the first trained network comprises a versioned model.

5. The method of claim 4 wherein the versioned model comprises a weighted model.

6. The method of claim 4 wherein the versioned model comprises an identification of a training dataset.

7. The method of claim 1 further comprising tracking the new model as auto-labeled.

8. The method of claim 1 further comprising tracking the first trained network and first dataset.

9. The method of claim 1 wherein the untrained network is trained in a semi-supervised manner.

10. The method of claim 1 wherein the first dataset is labeled according to a first ontology.

11. The method of claim 10 wherein the first dataset is also labeled according to a second ontology.

12. An apparatus for managing a dataset comprising:
at least one processor; and
at least one memory coupled with the at least one processor and storing instructions operable, when executed by the at least one processor, to cause the apparatus to:
receive, at a device that is remotely located from an agent, sensor data collected by one or more sensors associated with the agent and a first dataset including an unlabeled object and one or more labeled objects in a set of frames captured via the one or more sensors over a period of time, the dataset and the sensor being received based on a connection bandwidth at the agent being greater than a bandwidth threshold, the one or more labeled objects being labeled by a first trained network at the agent;

infer, at a second trained network at the device, a new label for the unlabeled object based on the one or more labeled object in the first dataset and a second dataset including one or more objects similar to the unlabeled object, the new label being different than a respective label associated each of the one or more labeled objects;

label the unlabeled object with the new label to generate a third dataset; and train an untrained network using the third dataset to generate a new model.

13. The apparatus of claim 12 wherein the dataset comprises data from a group of sensors.

14. The apparatus of claim 13 wherein the group of sensors include two or more of a LiDAR sensor, a RADAR sensor, an RGB camera, monocular camera, and/or stereo camera.

15. The apparatus of claim 12 wherein the first trained network comprises a versioned model.

16. The apparatus of claim 15 wherein the versioned model comprises a weighted model.

17. The apparatus of claim 15 wherein the versioned model comprises an identification of a training dataset.

18. The apparatus of claim 12 wherein the new model is tracked as auto-labeled.

19. The apparatus of claim 12 wherein the untrained network is trained in a semi-supervised manner.

20. A non-transitory computer-readable medium for managing a dataset and including instructions that when executed by one or more processors cause the one or more processors to:

receive, at a device that is remotely located from an agent, sensor data collected by one or more sensors associated with the agent and a first dataset including an unlabeled object and one or more labeled objects in a set of frames captured via the one or more sensors over a period of time, the dataset and the sensor being received based on a connection bandwidth at the agent being greater than a bandwidth threshold, the one or more labeled objects being labeled by a first trained network at the agent;

inferring, at a second trained network at the device, a new label for the unlabeled object based on the one or more labeled object in the first dataset and a second dataset including one or more objects similar to the unlabeled object, the new label being different than a respective label associated each of the one or more labeled objects;

label the unlabeled object with the new label to generate a third dataset; and train an untrained network using the third dataset to generate a new model.

* * * * *